(12) United States Patent
Livne (10) Patent No.: US 8,534,754 B2
(45) Date of Patent: Sep. 17, 2013

(54) BICYCLE APPARATUS USABLE AS A SEAT SUPPORT DEVICE AND AS A BICYCLE LOCK

(75) Inventor: Oren Livne, Tel Aviv (IL)

(73) Assignee: Ino Vision Ltd., Tel Aviv (IL)

( * ) Notice: Subject to any disclaimer, the term of this patent is extended or adjusted under 35 U.S.C. 154(b) by 227 days.

(21) Appl. No.: 12/665,085

(22) PCT Filed: Jun. 4, 2008

(86) PCT No.: PCT/IL2008/000754
§ 371 (c)(1),
(2), (4) Date: Dec. 17, 2009

(87) PCT Pub. No.: WO2008/155754
PCT Pub. Date: Dec. 24, 2008

(65) Prior Publication Data
US 2010/0187868 A1    Jul. 29, 2010

(51) Int. Cl.
*B62J 1/00*    (2006.01)
*B62H 5/00*    (2006.01)
*E05B 71/00*    (2006.01)

(52) U.S. Cl.
USPC ............. 297/201; 297/118; 297/129; 70/234; 70/233

(58) Field of Classification Search
USPC .................... 297/195.13, 215.13, 463, 463.2, 297/201, 118, 129; 70/233–236, 31, 35; 280/288.4
See application file for complete search history.

(56) References Cited

U.S. PATENT DOCUMENTS

| 3,747,376 | A | * | 7/1973 | White, Jr. .......................... 70/18 |
| 4,568,121 | A | | 2/1986 | Kashima |
| 4,877,286 | A | | 10/1989 | Hobson et al. |
| 5,156,031 | A | | 10/1992 | Gaul |
| 5,244,301 | A | | 9/1993 | Kurke et al. |
| 5,380,061 | A | | 1/1995 | Pendleton |
| 5,405,113 | A | | 4/1995 | Jaw |
| 5,622,066 | A | | 4/1997 | Shallis |
| 5,678,435 | A | | 10/1997 | Hodson |
| 5,709,430 | A | | 1/1998 | Peters |
| 5,823,618 | A | | 10/1998 | Fox et al. |
| 5,911,474 | A | | 6/1999 | Lee |
| 5,979,978 | A | | 11/1999 | Olsen et al. |
| 6,036,214 | A | | 3/2000 | Ono et al. |
| 6,290,291 | B1 | | 9/2001 | Kojima |
| 6,402,236 | B1 | | 6/2002 | Yates |

(Continued)

FOREIGN PATENT DOCUMENTS

| DE | 101055 | 2/1898 |
| DE | 4336605 | 5/1995 |
| DE | 10023978 | 11/2001 |
| DE | 10042821 | 4/2002 |

(Continued)

*Primary Examiner* — David Dunn
*Assistant Examiner* — Tania Abraham
(74) *Attorney, Agent, or Firm* — Dekel Patent Ltd.; David Klein (57) ABSTRACT

Bicycle apparatus for use with a bicycle that, includes a bicycle seat post, the apparatus including at least one bicycle seat support member (14), a pair of locking members (28,30) mechanically linked to the bicycle-seat support member (14), and a lock (32) adapted to lock the locking members (28,30) to each other, wherein in a first position the bicycle seat support member (14) is securable to a bicycle seat post of a bicycle for use as a bicycle seat support, and in a second position the bicycle seat support member (14) is arranged for locking the bicycle by being locked with the locking members (28,30) and the lock (32).

4 Claims, 7 Drawing Sheets

(56) References Cited

U.S. PATENT DOCUMENTS

| | | | | |
|---|---|---|---|---|
| 6,820,448 | B1 * | 11/2004 | Hsieh | 70/18 |
| 7,316,302 | B2 * | 1/2008 | Hogesta | 188/265 |
| 7,624,605 | B2 * | 12/2009 | Vitali | 70/233 |
| 2003/0074933 | A1 | 4/2003 | St. Amand | |
| 2007/0277569 | A1 | 12/2007 | Vitali | |

FOREIGN PATENT DOCUMENTS

| | | |
|---|---|---|
| DE | 20212353 | 11/2002 |
| DE | 20220513 | 9/2003 |
| EP | 0849148 | 6/1998 |
| GB | 2414218 | 11/2005 |
| KR | 2003 0039431 | 5/2003 |

* cited by examiner

BICYCLE APPARATUS USABLE AS A SEAT SUPPORT DEVICE AND AS A BICYCLE LOCK

CROSS-REFERENCE TO RELATED APPLICATIONS

This application is a national phase of PCT patent application PCT/IL2008/000754, filed Jun. 4, 2008, which claims priority from U.S. patent application Ser. No. 11/764,201, filed Jun. 17, 2007, the contents of which are hereby incorporated by reference in their entirety.

FIELD OF THE INVENTION

This invention relates generally to bicycle seats, and particularly to a bicycle seat that doubles as a bicycle lock.

BACKGROUND OF THE INVENTION

Many kinds of bicycle seats are known (also called bicycle saddles, the terms being used interchangeably). Some are designed to maximize comfort and others are designed for specific purposes such as weight distribution.

SUMMARY OF THE INVENTION

The present invention seeks to provide a novel a bicycle seat, which doubles as a bicycle lock, as is described more in detail hereinbelow.

There is thus provided in accordance with an embodiment of the invention bicycle apparatus for use with a bicycle that includes a bicycle seat post, the apparatus including at least one bicycle seat support member, a pair of locking members mechanically linked to the bicycle seat support member, and a lock adapted to lock the locking members to each other, wherein in a first position the bicycle seat support member is securable to a bicycle seat post of a bicycle for use as a bicycle seat support, and in a second position the bicycle seat support member is arranged for locking the bicycle by being locked with the locking members and the lock.

In accordance with non-limiting embodiments of the invention, the bicycle seat support member is pivotally attached to a pivot block and arranged for pivoting about pivot axes of the pivot block. For example, the bicycle seat support member can be attached to the pivot block with a ratchet connection so that the bicycle seat support member is selectively fixable at different angular positions.

In accordance with non-limiting embodiments of the invention, a pair of saddle members are secured to the bicycle seat support member. At least one rear bracket arm is secured to the bicycle seat support member, the bracket arm being formed with a ring, wherein in the first position the locking members are received in the ring. One of the locking members may be received in an aperture formed in a seat-post adapter block, and the seat-post adapter block can be attached to the bicycle seat post of the bicycle. The locking member can either slip into the aperture or can be locked into the aperture.

BRIEF DESCRIPTION OF THE DRAWINGS

The present invention will be understood and appreciated more fully from the following detailed description taken in conjunction with the drawings in which.

DETAILED DESCRIPTION OF EMBODIMENTS

Reference is now made to FIGS. 1A-1D, which illustrate a bicycle seat 10, constructed and operative in accordance with a non-limiting embodiment of the present invention.

In the illustrated embodiment, bicycle seat 10 includes one or more (preferably a pair of) saddle members 12 secured to bicycle seat support members 14, such as at attachment members 16. Saddle members 12 may be detachable from bicycle seat support members 14 (such as with quick release fasteners) or they may be permanently fixed thereto (such as with rivets or bolts and such). Bicycle seat support members 14 are pivotally attached to a pivot block 18. Pivot block 18 is positioned forward of saddle members 12 (that is, forward in the sense of the forward riding direction of the bicycle). For example, each bicycle seat support member 14 is formed with a forward aperture 20 which is pinned to a corresponding aperture 22 formed in pivot block 18. Instead of a simple pinned connection, bicycle seat support members 14 may be attached to pivot block 18 with a ratchet connection (detents and pawls, for example) so that each bicycle seat support member 14 can be rotated about a pivot axis 23 (FIG. 1A) and selectively fixed at different angular (azimuthal) positions. In this manner, the separation between the two saddle members 12 can be adjusted to suit the rider (especially useful for male riders).

A pair of rear bracket arms 24 are secured to the attachment members 16 of bicycle seat support members 14 (either fixedly or removably attached). The bracket arms 24 may or may not be pivotally attached to attachment members 16. The rear portion of each bracket arm 24 may be higher than the forward portion (this being the usual position of the seat with respect to the bicycle frame). The forward portion of each bracket arm 24 is formed with a ring 26.

Figure 1A:
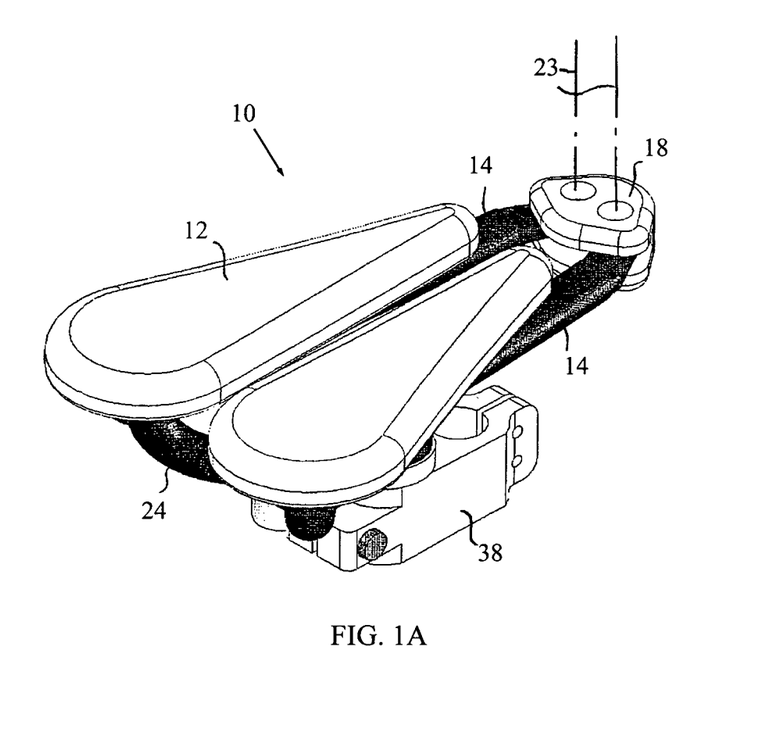
FIGS. 1A, 1B, 1C, and 1D are simplified upper perspective, lower perspective, side-view and exploded illustrations, respectively, of a combination bicycle seat and bicycle lock, constructed and operative in accordance with an embodiment of the present invention.
Figure 1B:
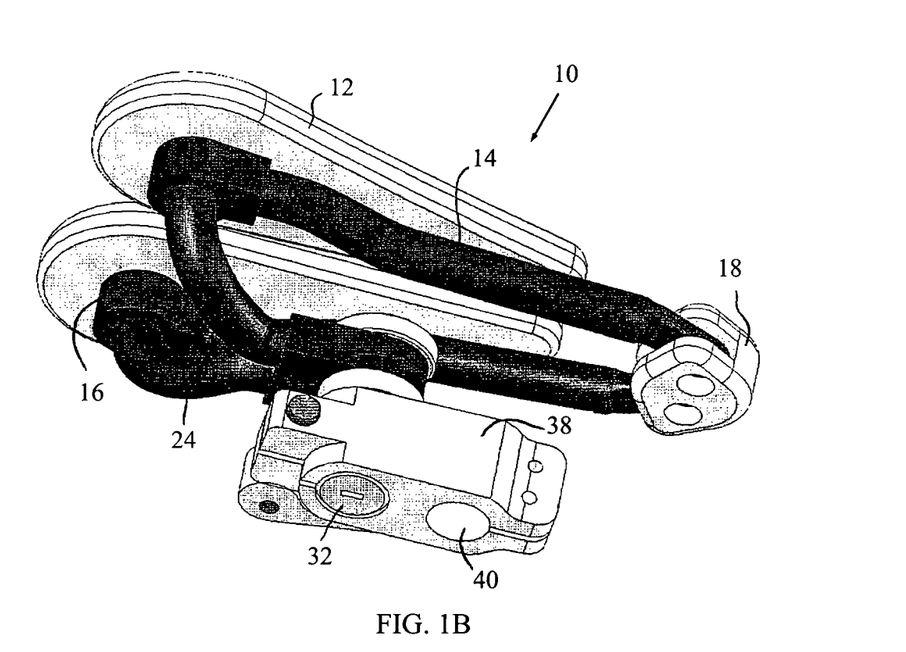
Figure 1C:
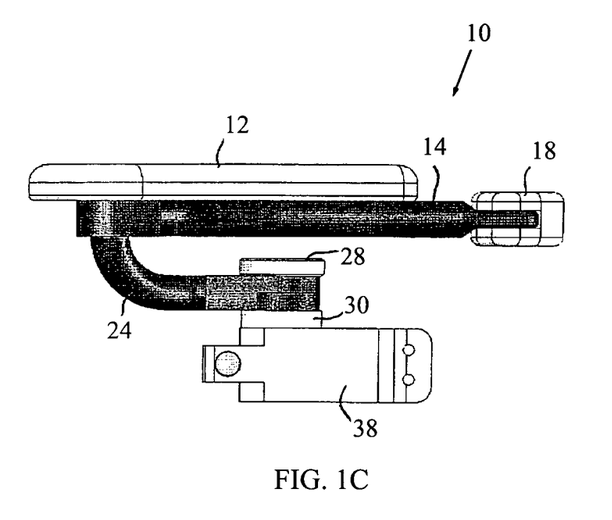
Figure 1D:
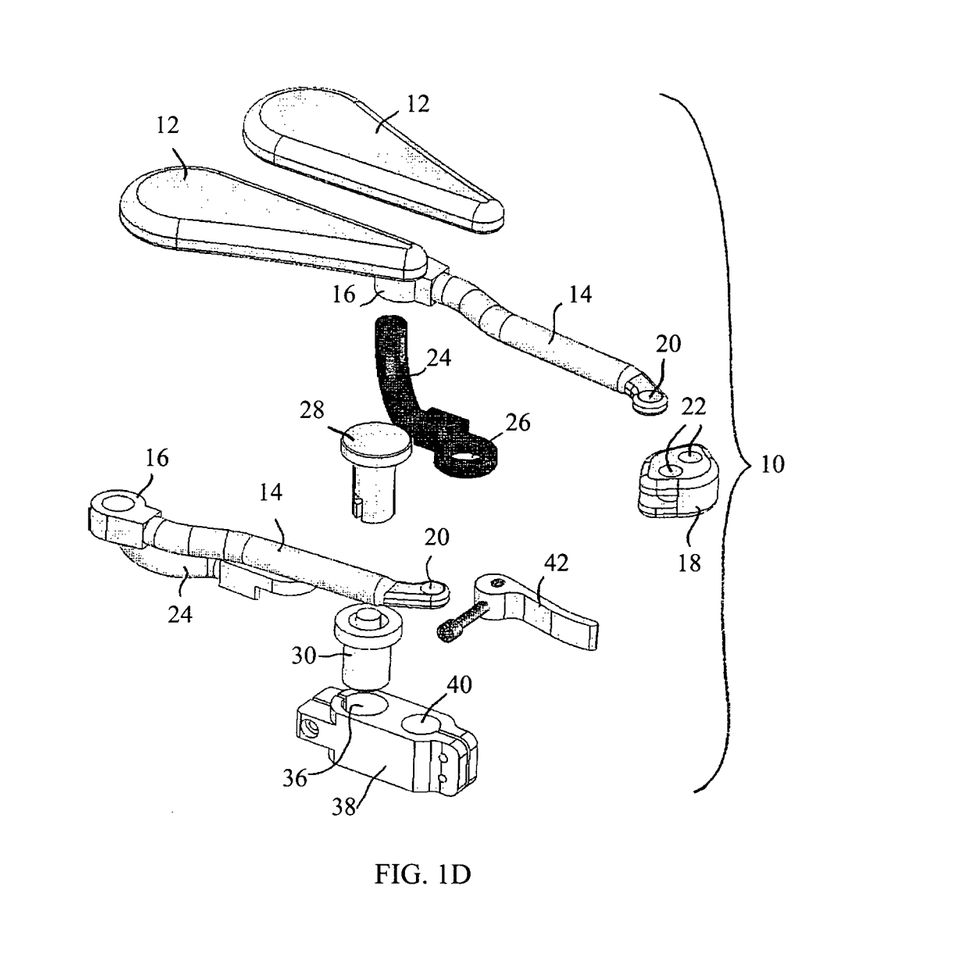
Figure 2A:
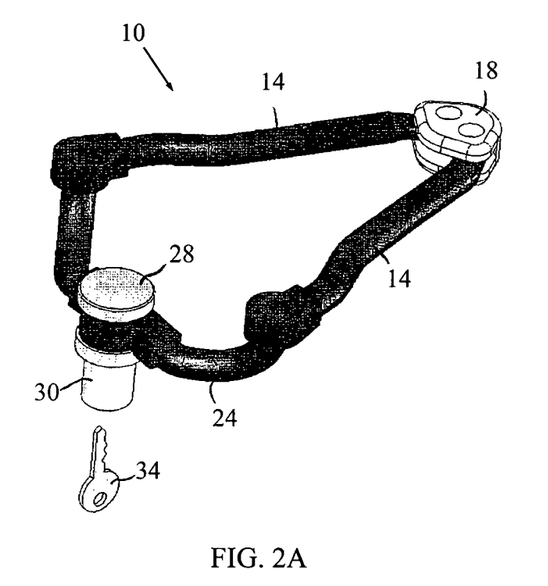
FIGS. 2A and 2B are simplified perspective illustrations of the bicycle lock of FIGS. 1A-1D, respectively in locked and unlocked orientations.
Figure 2B:
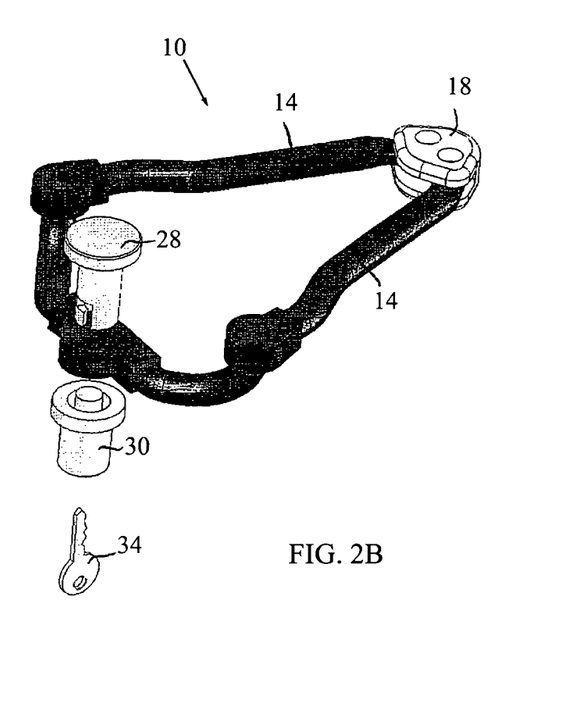

Reference is made additionally to FIGS. 2A and 2B. Upper and lower locking members 28 and 30 are received in rings 26. The lower locking member 30 includes a lock 32 (FIG. 1B), such as a cylinder tumbler lock, which is opened with a suitable key 34. The lower locking member 30 is received in an aperture 36 formed in a seat-post adapter block 38. The seat-post adapter block 38 can be slipped over a seat post of a bicycle (not shown) by means of another aperture 40 and tightened by means of a (standard) tightener 42. The lower locking member 30 may be simply slipped into aperture 36. Alternatively, lock 32 may be used to lock lower locking member 30 into aperture 36 (such as by means of a locking tongue that is operated by turning the key 34 and which engages a groove or similar member in seat-post adapter block 38).

It is clear from the foregoing description that bicycle seat 10 can be easily attached to the bicycle seat post by means of seat-post adapter block 38.

Figure 3:
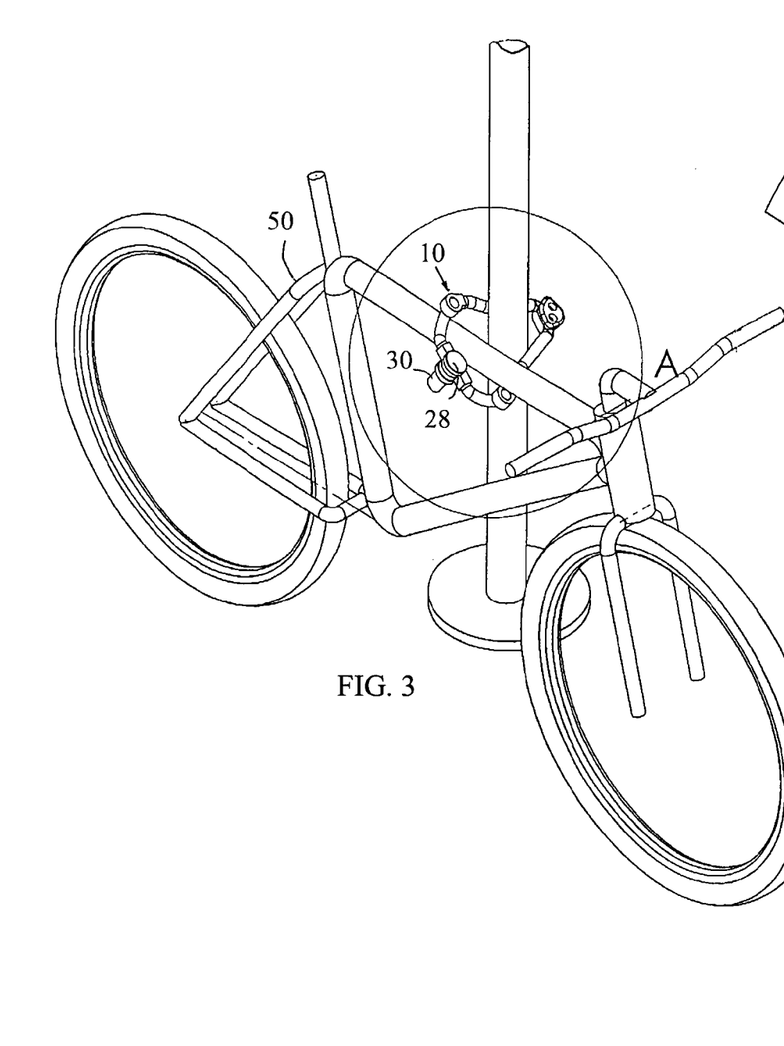
FIGS. 3 and 3A are simplified illustrations of using the bicycle seat to lock a bicycle, in accordance with an embodiment of the present invention.
Figure 3A:
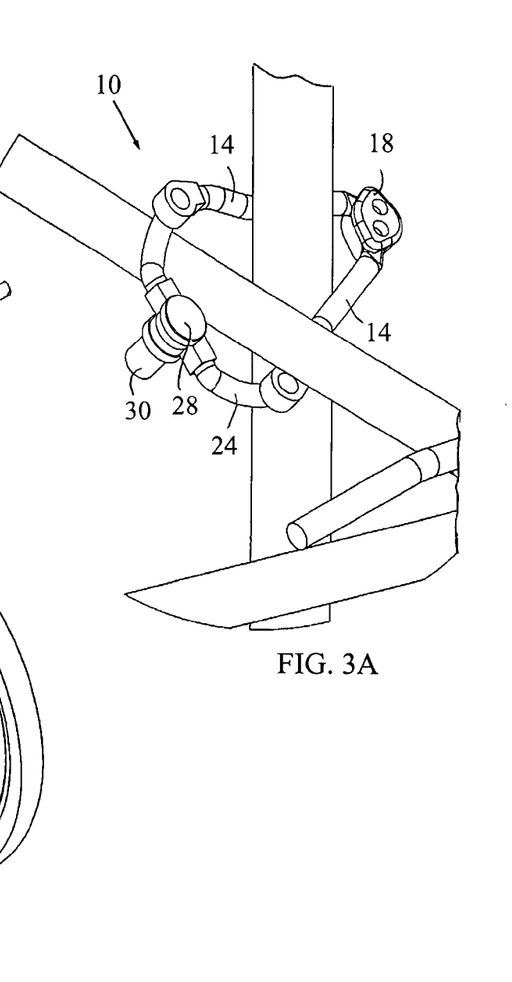

Reference is now made to FIGS. 3 and 3A. In accordance with an embodiment of the present invention, bicycle seat 10 can be removed from seat-post adapter block 38 (either by simply lifting out of aperture 36 or by first unlocking lock 32 and then lifting out of aperture 36) and used as a bicycle lock to lock a bicycle 50. Upper and lower locking members 28 and 30 are separated and the two bicycle seat support members 14 are spread apart by pivoting about pivot block 18 (that is, pivoting about pivot axes 23 shown in FIG. 1A). The bicycle seat support members 14 are placed about some suitable structure for locking the bicycle 50 and locking members 28 and 30 are locked together with lock 32.

It is noted that the seat post of the bicycle can also form part of the lock of the invention. For example, the seat post can be used like the post of a steering wheel lock to lock the bicycle to some object with locking members 28 and 30.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately or in any suitable subcombination.

What is claimed is:

1. Bicycle apparatus for use with a bicycle that includes a bicycle seat post, the apparatus comprising:
   a bicycle seat comprising at least one saddle member secured to bicycle seat support members pivotally attached to bracket arms; and
   locking members, one of said locking members including a lock, wherein the locking members and said bicycle seat have a locked orientation in which said bicycle seat support members and said bracket arms are pivotedly moved with respect to one another to a locking position, and said bicycle seat support members and said bracket arms are arranged for locking the bicycle by being placed about some suitable structure and said lock locks said locking members together, wherein in the locked orientation said bicycle seat is removed from a seat post adapter block, and wherein one of said locking members is received in and aperture formed in said seat-post adapter block.

2. The bicycle apparatus according to claim 1, wherein in the locked orientation, said bicycle seat is lifted out of said aperture.

3. The bicycle apparatus according to claim 1, wherein said lock locks said one of said locking members into said aperture.

4. Bicycle apparatus for use with a bicycle that includes a bicycle seat post, the apparatus comprising:
   a bicycle seat comprising at least one saddle member secured to bicycle seat support members pivotally attached to bracket arms; and
   locking members, one of said locking members including a lock, wherein the locking members and said bicycle seat have a locked orientation in which said bicycle seat support members and said bracket arms are pivotedly moved with respect to one another to a locking position, and said bicycle seat support members and said bracket arms are arranged for locking the bicycle by being placed about some suitable structure and said lock locks said locking members together, wherein in the locked orientation said bicycle seat is removed from a seat post adapter block, and wherein in a first position said locking members are received in a portion of said bracket arms.

* * * * *